United States Patent [19]

Fielding

[11] Patent Number: 4,855,151

[45] Date of Patent: Aug. 8, 1989

[54] POTATO PRODUCT WITH ASYMMETRIC CORRUGATIONS

[75] Inventor: Mimi S. Fielding, Gig Harbor, Wash.

[73] Assignee: Curtice-Burns, Inc., Rochester, N.Y.

[21] Appl. No.: 155,314

[22] Filed: Feb. 12, 1988

Related U.S. Application Data

[63] Continuation of Ser. No. 900,738, Aug. 27, 1986, abandoned.

[51] Int. Cl.[4] ............................................. A23L 1/217
[52] U.S. Cl. ..................................... 426/144; 426/637
[58] Field of Search ................................ 426/144, 637

[56] References Cited

U.S. PATENT DOCUMENTS

| | | | |
|---|---|---|---|
| Re. 29,773 | 9/1978 | Wisdom et al. ............... | 426/637 X |
| Des. 239,215 | 3/1976 | Miller .......................... | D1/23 |
| 678,514 | 7/1901 | Regnier . | |
| 1,965,500 | 7/1934 | Knott . | |
| 1,965,501 | 7/1934 | Knott . | |
| 2,132,690 | 10/1938 | Hilliard . | |
| 2,612,453 | 9/1952 | Stahmer . | |
| 2,686,720 | 8/1954 | La Rosa . | |
| 2,769,714 | 11/1956 | Stahmer . | |
| 2,769,715 | 11/1956 | Stahmer . | |
| 3,230,094 | 1/1966 | Hilton . | |
| 3,358,379 | 12/1967 | Coley . | |
| 3,391,005 | 7/1968 | Babigan . | |
| 3,545,979 | 12/1970 | Ghafoori . | |
| 3,687,688 | 8/1972 | Stapley et al. . | |
| 3,956,517 | 5/1976 | Curry et al. ................. | 426/144 |
| 3,998,975 | 12/1976 | Liepa .......................... | 426/637 |
| 4,140,801 | 2/1979 | Hilton et al. ................ | 426/637 |
| 4,166,136 | 8/1979 | Stoll ........................... | 426/144 |
| 4,219,575 | 8/1980 | Saunders et al. ............ | 426/637 |
| 4,235,941 | 11/1980 | Coats .......................... | 426/646 |
| 4,272,554 | 6/1981 | Schroeder et al. .......... | 426/637 |
| 4,277,510 | 7/1981 | Wicklund et al. ........... | 426/637 |
| 4,283,437 | 8/1981 | Fan et al. .................... | 426/637 |
| 4,304,326 | 12/1981 | Fowler ........................ | 198/623 |
| 4,337,275 | 6/1982 | Adams ........................ | 426/144 |
| 4,348,166 | 9/1982 | Fowler ........................ | 425/310 |
| 4,508,739 | 4/1985 | Ryan ........................... | 426/144 |
| 4,511,586 | 4/1985 | Fitzwater et al. ........... | 426/144 |
| 4,514,430 | 4/1985 | Hartman ..................... | 426/549 |
| 4,517,204 | 5/1985 | Mottur et al. ............... | 426/94 |
| 4,530,849 | 7/1985 | Stanley et al. .............. | 426/144 |

FOREIGN PATENT DOCUMENTS 701899 1/1965 Canada .
898057 4/1972 Canada .

*Primary Examiner*—Arthur L. Corbin
*Attorney, Agent, or Firm*—Christensen, O'Connor, Johnson & Kindness

[57] ABSTRACT

A potato chip or snack product having corrugated upper and lower surfaces. The corrugations are defined by an asymmetric waveform. The waveforms on the upper and lower surfaces are in phase which each other.

4 Claims, 1 Drawing Sheet

POTATO PRODUCT WITH ASYMMETRIC CORRUGATIONS

This is a continuation of the prior application Ser. No. 06/900,738, filed Aug. 27, 1986, now abandoned, the benefit of the filling dates of which are hereby claimed under 35 USC 120.

BACKGROUND OF THE INVENTION

The present invention relates to sliced food products having corrugations on opposite surfaces and methods for manufacturing the same.

Food products commonly known as potato chips can be made from sliced potatoes or potato dough sheets. Conventional chips are generally made from flat slices of potatoes. Some chips are provided with parallel corrugations to provide a chip having a higher strength and different texture than conventional flat chips. Recently, the corrugations have been altered in an attempt to enhance the texture, appearance and flavor of the food product. One such product is described and claimed in U.S. Pat. No. 4,511,586 to Fitzwater et al. The Fitzwater et al. patent is directed to a potato chip product having corrugations on both sides of the chip. These corrugations have the same frequency and amplitude, but are phase-shifted by ¼ of the pitch distance between corrugations. This phase-shifted configuration, according to Fitzwater et al. provides a potato chip product that exhibits unique flavor and texture characteristics after cooking. This Fitzwater et al. configuration, however, yields a product that is relatively soft and exhibits moderately undesirable breakage in the package when subjected to normal handling. The phase-shifted product is also relatively thick, which can lead to burning and blistering problems during the cooking process.

SUMMARY OF THE INVENTION

The present invention provides a corrugated chip product that is significantly firmer than prior conventional and phase-shifted corrugated chips and provides a resistance to biting that is aesthically desirable, that is, the chip produced in accordance with the present invention is crunchier than prior chips. Moreover, the product of the present invention has a lesser propensity for breakage than prior conventional and phase-shifted corrugated chips. Because the chip of the present invention has a thickness variation, it is easier to cook than conventional corrugated chips. Also, because there is less differentiation in the thick and thin portions of the chip of the present invention, the overall chip can be made thinner while yet achieving a harder, crunchier texture than prior phase-shifted and corrugated chips. At the same time, a chip prepared in accordance with the present invention is generally thinner than prior phase-shifted corrugated chips while exhibiting substantially less breakage during ordinary handling.

These and other advantages are provided by a food product comprising a slice or sheet of edible material such as potato, having upper and lower or opposite surfaces. The opposite surfaces have substantially parallel corrugations. The corrugations are each defined by periodic waveforms that have substantially the same amplitude and frequency and that are asymmetric about their peaks aligning the waveforms, that is, by maintaining them in phase, the precise relationship of thick and thin cross sections can be controlled to yield the desirable characteristics of the chip produced in accordance with this invention.

BRIEF DESCRIPTION OF THE DRAWINGS

A better understanding of the present invention can be derived by reading the ensuing specification in conjunction with the accompanying drawings wherein.

DETAILED DESCRIPTION OF THE PREFERRED EMBODIMENTS

Figure 1:
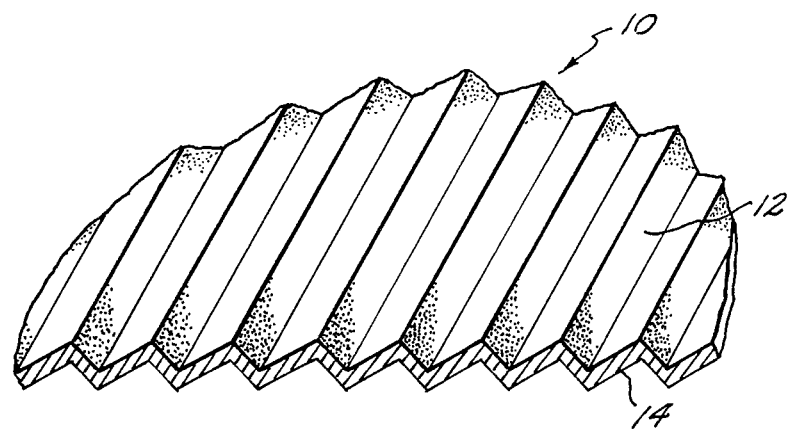
FIG. 1 is an isometric view of a corrugated food product produced in accordance with the present invention.

Referring first to FIG. 1, a food product 10 has upper and lower corrugated surfaces 12 and 14. The preferred embodiment of the present invention comprises a potato product, more specifically a potato product made from sliced potatoes or potato dough sheets. Ridges and valleys of the corrugations on the upper and lower surfaces 12 and 14 are parallel with each other so that a cross section taken at right angles to the ridges and valleys is substantially the same at any location on the chip product.

Figure 2:
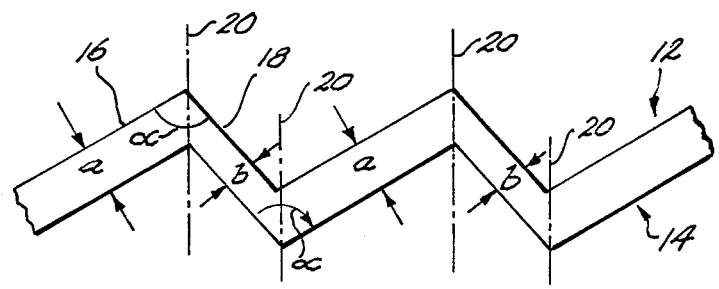
FIG. 2 is an enlarged cross-sectional view at right angles to the corrugations of the product showing the precise structure of the waveforms defining the corrugations.

The cross-sectional view shown in FIG. 2 is representative of the waveforms defining the corrugations on the upper and lower surfaces 12 and 14 at any location on the chip. The preferred waveform is periodic to yield uniformity across the entire width of a chip. In order to achieve the desired characteristics, the periodic waveform must be asymmetrical about its peak or inflection points. The waveform defining the corrugations of the upper surface 12 is substantially identical to the waveform defining the corrugation of the lower surface 14. The upper and lower waveforms are maintained in phase with each other such that lines 20 drawn through corresponding peaks and corresponding valleys of the waveforms are both parallel with each other and parallel to the ordinate of the waveform. Thus, each waveform has a first side 16 and a second side 18 that are of unequal length. Preferably, the length of the first side is from one and one-half to two times the length of the second side. Moreover, it is preferred that the angle between the first and second side ranges from 60 to 90 degrees and preferably from 70 to 80 degrees. (It is to be noted that FIG. 2 is not drawn to scale, but is slightly exaggerated to clearly show the concepts of the invention.)

By so configuring the waveforms, the thickness a of the chip along a line perpendicular to the surfaces defined by the first side of the waveform can be maintained at a relatively high level. The thickness b along a line running perpendicular to the upper and lower surfaces defined by the second side of the waveform is substantially thinner. This configuration results in a chip that has textural and taste characteristics that are at least as good as those of prior art products, however, at the same time provides a chip that is substantially more resistant to breakage than prior art chips. Moreover, once the chip is cooked, it has a greater resistance to biting which is more aesthetically pleasing than the softer, airy chips of the prior art. The asymmetric configuration of the waveform also provides a chip that is thinner overall, but still resulting in a chip that is less resistant to breakage than prior corrugated chips.

Figure 3:
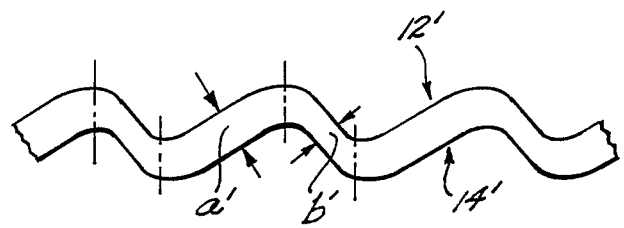
FIG. 3 is an alternate embodiment of the waveforms shown in FIG. 2.

Referring now to FIG. 3, a variation on the waveform disclosed in connection with FIG. 2 illustrates that a true sawtooth waveform is not necessary to achieve the results of the present invention. Again, the waveform shown in FIG. 3 is periodic yet asymmetric about its peak or inflection points. The waveforms on the upper and lower surfaces 12' and 14' are still in phase. Thus, the desirable local variations in thickness a' and b' can still be achieved.

The present invention has been disclosed in conjunction with a preferred embodiment. One of ordinary skill will be able to make various alterations, changes and substitutions of equivalents without departing from the broad concepts disclosed herein. It is therefore intended that the Letters Patent granted hereon be limited only by the definition contained in the appended claims and equivalents thereof.

The embodiments of the invention in which an exclusive property or privilege is claimed are defined as follows:

1. A food product comprising a slice or sheet of edible material having an upper surface and a lower surface, said upper surface and said lower surface having substantially parallel corrugations thereon, said corrugations being characterized by a sawtooth function having substantially the same frequency and amplitude, each tooth being asymmetric about its peak, each tooth having first and second sides, said first side being longer than said second side, the corrugations on said upper surface being in phase with the corrugations on said lower surface to yield a relatively thick section adjacent the first side of said tooth and a relatively thin section adjacent the second side of said tooth.

2. The food product of claim 1 wherein the sides of said sawtooth function are straight, the first side being from one and one-half to two times the length of said second side.

3. The food product of claim 1 wherein said sheet or slice comprises potato.

4. A food product comprising a potato sheet or potato slice having substantially parallel corrugations on opposite surfaces thereon, said corrugations each defined by a periodic waveform having substantially the same amplitude and frequency, said waveform being asymmetric about its peak, each wave having first and second sides, said first side being longer than said second side, the waveforms on said opposite surfaces being in phase to yield a relatively thick section adjacent the first side of said wave and a relatively thin section adjacent the second side of said wave.

* * * * *

UNITED STATES PATENT AND TRADEMARK OFFICE
CERTIFICATE OF CORRECTION

PATENT NO. : 4,855,151
DATED : August 8, 1989
INVENTOR(S) : M.S. Fielding

It is certified that error appears in the above-identified patent and that said Letters Patent is hereby corrected as shown below:

| Column | Line | |
|---|---|---|
| 1 | 23 | "Fitzwa-ter" should be --Fitzwater-- |
| 1 | 43 | "aesthically" should be --aesthetically-- |
| 2 | 49 | "side" should be --sides-- |
| 2 | 54 | "a" should be --$\underline{a}$-- (add emphasis) |
| 2 | 57 | "b" should be --$\underline{b}$-- (add emphasis) |
| 3 | 10 | "a'" should be --$\underline{a}'$-- (add emphasis) |
| 3 | 10 | "b'" should be --$\underline{b}'$-- (add emphasis) |
| 4 | 17 | "thereon" should be --thereof-- |
| 4 | 23 | "phase" should be --phase,-- |

Signed and Sealed this

Second Day of October, 1990

Attest:

HARRY F. MANBECK, JR.

*Attesting Officer*        *Commissioner of Patents and Trademarks*